Sept. 25, 1928.  
E. STOCK  
1,685,343  
METHOD FOR PLANNING STORMPROOF ZONES AROUND OR THROUGH WOOD DISTRICTS  
Filed July 13, 1926
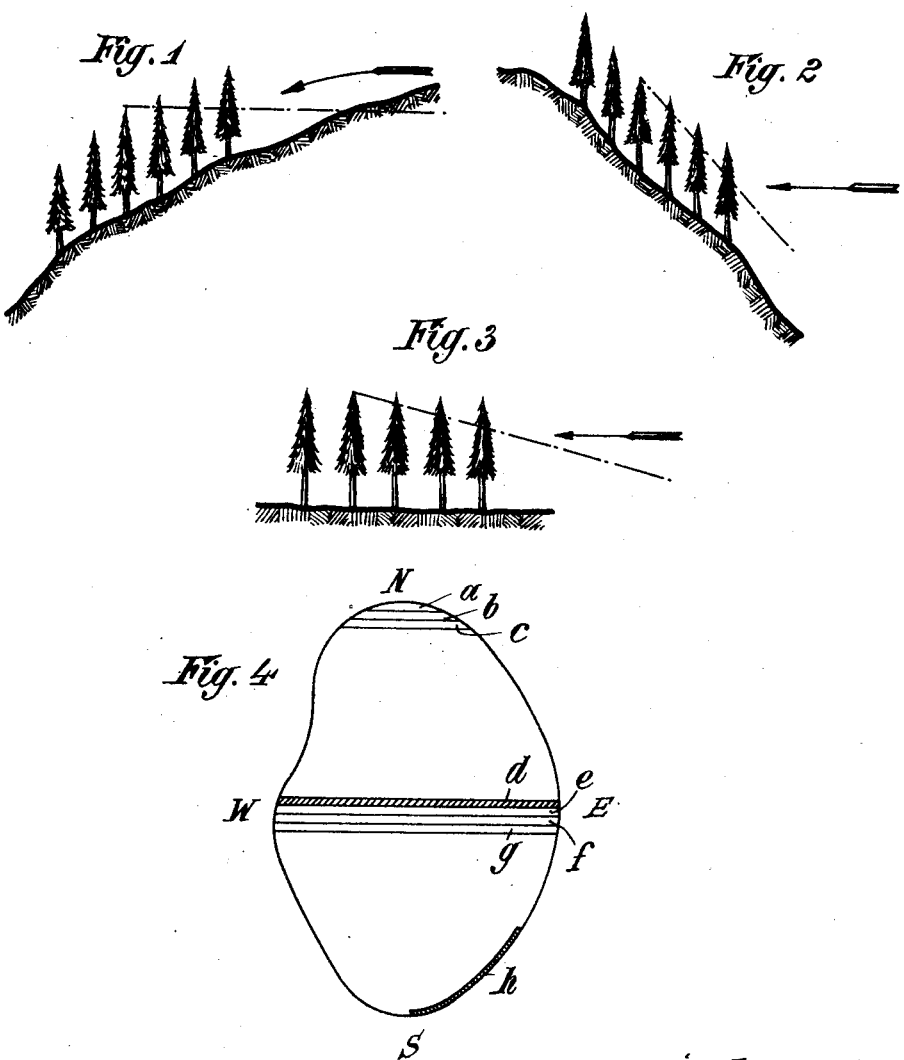

Patented Sept. 25, 1928.

1,685,343

UNITED STATES PATENT OFFICE.

EMIL STOCK, OF BAD FLINSBERG OF SILESIA, GERMANY.

METHOD FOR PLANNING STORMPROOF ZONES AROUND OR THROUGH WOOD DISTRICTS.

Application filed July 13, 1926, Serial No. 122,195, and in Germany July 20, 1925.

It has been repeatedly noticed that the trunks of trees on the outskirts of a forest are loose at their roots and bent over or broken by the influence of the wind or air currents. This is due to the fact that the wind is banked up in front of a forest and therefore exercises a great strain upon the trunks, which latter are thereby broken, split or cracked off.

According to the present invention the tops of the trees comprising the front rows or those near the outskirts of the forest are sawed or cut off in such a way that the standing portions form an upwardly inclined plane relative to the plane of the ground upon which the trees are growing, whereby the wind is immediately deflected onto this plane and thus will not bank up before the front or edge of the forest to subject the trees to excessive or damaging strains. This will prevent the breaking or splitting of the trees and also prevent them from being blown over since their lengths are considerably diminished and form a deflector for the wind.

In the drawings several methods are diagrammatically illustrated for treating forests both on level ground and on hillsides and in which, Figure 1 is a diagrammatic view of a hillside forest showing by the dot and dash line where the trees of the first three rows nearest the top are to be polled or cut.

Fig. 2 is a similar view showing where the polling takes place on the bottom rows of trees.

Fig. 3 is a diagrammatic view of a forest on level ground showing where the trees at the edge are to be polled.

Fig. 4 is a diagram showing the stormproof outskirts of a large forest being separated by a cross-clearing.

The method according to the present invention is carried out as follows:

At the outskirts of the forest a zone, the width of which is determined according to the angle of inclination of the ground, is established by sawing off or polling the tops of the trees at predetermined points of their length in an upwardly inclined plane which is above the tops of any of the trees behind those which have been treated. The present method is applicable to forests which may be subjected to any wind currents in any direction and may be applied to hillside forests where the wind will travel up the side of the hill as shown in Figs. 1 and 2 as well as to forests which are on level ground and which receive horizontal wind-currents; that is to say wind-currents traveling horizontally as shown in Fig. 3. The arrows indicate the direction of the wind and the dot and dash lines indicate where the trees are to be polled. The present method is based upon the principle of displacing the center of gravity of the trunks of the trees growing at the outskirts of a forest by polling or sawing off the tops of the trees and to thereby increase the surface area against which the wind acts whereby its power is diminished and will not be able to crack the trunks or to loosen the roots and thereby blow the trees down, since the wind is deflected due to the oblique surface. These stormproof outskirts therefore render the power of a storm ineffective and alter also the path or direction of the wind by forcing it to sweep over the forest.

Stormproof protections of this kind may surround the entire forest; but in the districts in which the dangerous directions of the wind are known, which for many localities are for instance from the south, southeast and west, it is sufficient to provide the protecting zone around such parts of the forest from which the winds appear.

The process also permits the establishment of cross zones which separate the forest whereby the trees of the zone $d$ of the separating cutting opposed to the direction of the wind are also polled down. This separating cutting further enables the employment of a method for clearing up zones according to Wagner. According to the method of Wagner, a separating cutting, consisting of a zone $e$, is laid out from east to west. The trees in this zone $e$, the zone having a width of nearly 10 to 15 meters are entirely cut down. The zones $f$ and $g$, the so-called clearing cuttings, are of equal width and follow the cut zone $e$ in which the amount of wood which is utilized is continually growing less. Simultaneously with the rows or zones $e, f, g$ forming altogether a clearing, a series of rows $a, b, c$ is planned in the same manner at the northern outskirts and in the direction from east to west. The rows $a$ and $e$ are zones where the trees are entirely cut down and are reafforested instantly after being cut down. After a certain number of years, for instance in pine forests after 6 years or in mixed forests after 3 years, the corresponding rows $b$ and $f$ are entirely cut down and reafforested, and the corresponding rows $c$ and $g$ are thinned out and new zones are established and are thinned for the first time. The method according to Wagner serves therefore to utilize the forest in a short time and to reafforest it. In case where the forest is very large, several clearings may be planned across the forest. The shaded parts *d* and *h* in Fig. 4 signify the zone wherein the trees have been polled as above described. A lateral protecting zone *h* of polled trees may be provided in any direction of the compass.

The above described process may be repeatedly carried out in large forests. In trees which have only a few branches, as for instance, pines, the branches only need to be cut off for the purpose of diminishing the power of the wind.

The present method refers to the prevention of the damaging influence of air currents to the living mass of the wood. It is a technical method and the result may be instantaneously regarded, whereas methods for foresting wood districts will not be commercially successful until after a considerable time. The present method however is applicable to the oldest districts of the forest, whereas the hitherto known methods are only applicable to young trees.

The present method acts immediately and is applicable likewise in old districts of the forest and influences in the first line the tops of the trees and consequently effects a greater security at the roots. Further it serves not only for preparing a wood cutting, but also for preserving districts, until they reach the predetermined stage and is applicable in the innermost forest as well as in its outskirts, no matter in which direction of the compass the outskirts are directed.

The zones *a*, *b* and *c* of Fig. 4 are established at the outskirts of a forest and comprise sections which are cut and thinned in any desired manner. This method can also be used in large forests in which the trees are all practically the same age and which by means of divisional zones the forest is divided into parts in order to utilize the lumber therein before losses take place due to the age of the trees. This is clearly shown in Fig. 4 in which three sections, *e*, *f* and *g*, are adapted to be cut through the zones which divide the forest into parts. Adjacent these divisional sections is a portion *d* which is polled according to the invention.

I claim as my invention—

1. A method of protecting forests which comprises polling the trees at the outskirts of the forest to a depth into the forest of approximately three trees to deflect the air currents thereby preventing the air from banking up against the forest and subjecting the trees to excessive and damaging strains.

2. A method of protecting forests which comprises polling the trees at the outskirts of the forest to a depth into the forest of three rows of trees to deflect the air currents thereby preventing the air from banking up against the forest and subjecting the trees to excessive and damaging strains.

3. A method for planting a stormproof zone at the margin of a forest which comprises polling down the trunks in a plurality of rows of trees and cutting off the branches in an elevated inclined plane, thereby deviating the wind upwardly when reaching the forest and so decreasing the power of the storm on the forest.

4. A method for planning a stormproof area for a forest which comprises cutting off the branches of the trees of said forest in an inclined plane at the margin of the forest, and forming three zones parallel to the cut trees, the zone adjacent the cut trees being entirely cleared of trees, the next zone being widely cleared of trees, and the third zone being only slightly thinned of trees.

5. A method of protecting forests to prevent excessive and damaging strains on the trees, due to the wind which comprises trimming the trees at the outskirts of a forest to present an elevated inclined plane whereby the air currents are deflected and the air is prevented from banking up against the forest.

6. A method of protecting forests to prevent excessive and damaging strains on the trees due to the wind which comprises trimming the trees at the outskirts of a forest to a depth into the forest of approximately three trees to present an elevated inclined plane whereby the air currents are deflected and the air is prevented from banking up against the forest.

7. A method of protecting forests to prevent excessive and damaging strains on the trees due to the wind which comprises removing portions of the trees in predetermined zones whereby each zone presents an inclined plane relative to the surface of the earth to deflect the air currents.

8. A method of protecting forests which comprises removing the tops of the trees at the edge of a forest to a depth of at least two rows of trees into the forest in such a way that a surface is formed which is oblique to the surface of the earth and the center of gravity of the cut trees is shifted, so that the surface which the wind may grip on the single tree is reduced and the wind will be forced to take another direction over the tops of the trees behind the cut trees to thereby prevent the wind from banking up against the forest and subjecting the trees to excessive damaging strains.

In testimony whereof I have affixed my signature.

EMIL STOCK.